June 21, 1955

E. C. WILLIAMS 2,711,105

POWER TRANSMISSION

Original Filed June 16, 1950

Earl C. Williams
INVENTOR.

BY

William G. Landwier
AGENT

June 21, 1955　　　　E. C. WILLIAMS　　　　2,711,105
POWER TRANSMISSION

Original Filed June 16, 1950　　　　　　　　　3 Sheets-Sheet 2

Earl C. Williams
INVENTOR.

BY

William G. Landwier
AGENT

June 21, 1955  E. C. WILLIAMS  2,711,105
POWER TRANSMISSION

Original Filed June 16, 1950  3 Sheets-Sheet 3

*Earl C. Williams*
INVENTOR.

BY

*William D. Landuier*
AGENT

United States Patent Office 2,711,105
Patented June 21, 1955

2,711,105

POWER TRANSMISSION

Earl Charles Williams, Syracuse, N. Y.

Continuation of application Serial No. 168,427, June 16, 1950. This application June 2, 1951, Serial No. 229,615

13 Claims. (Cl. 74—681)

This invention relates to power transmission equipment, and more particularly to a mechanism for producing positive infinitely variable speed changes in a power transmission system.

This application is a continuation of my copending application Serial No. 168,427, filed June 16, 1950, for an improvement in Power Transmission Equipment.

The need for a simple positive infinitely variable speed changing mechanism has long been felt in industries such as the machine tool, textile, paper making, leather, and numerous other industries. It is essential in many mechanical systems, that the speed changing mechanism be positive in its transmission of variable rotary motion, since associated mechanisms must be kept in accurately timed relationship.

It is an object of this invention to provide a speed changing mechanism which is infinitely variable within the range of speeds for which it is designed.

It is a further object of this invention to provide a speed changing mechanism which is capable of being compactly designed for a particular installation with positive engagement between all members concerned with transmission of power through the device.

It is a further object of this invention to provide a mechanism wherein the ratio of rotation between two shafts is infinitely adjustable and can be maintained without variation regardless of the load being transmitted.

Other objects of the invention will appear hereinafter, the novel features and combinations being set forth in the appended claims.

Generally described, the present invention comprises in a housing at least one conical gear member, having uniformly spaced teeth generated thereon in at least one constant lead spiral path on the conical surface of said conical gear and in operable relationship with the spiral path on said conical gear member of at least one differential member. Axial adjustment of the differential member along the conical engaging surface of said conical member determines the speed ratio between input and output members.

A preferred embodiment of the invention has been chosen for purposes of illustration and description, and is shown in the accompanying drawings forming a part of the specification, wherein like figures refer to like parts wherever they occur:

Figure 1:
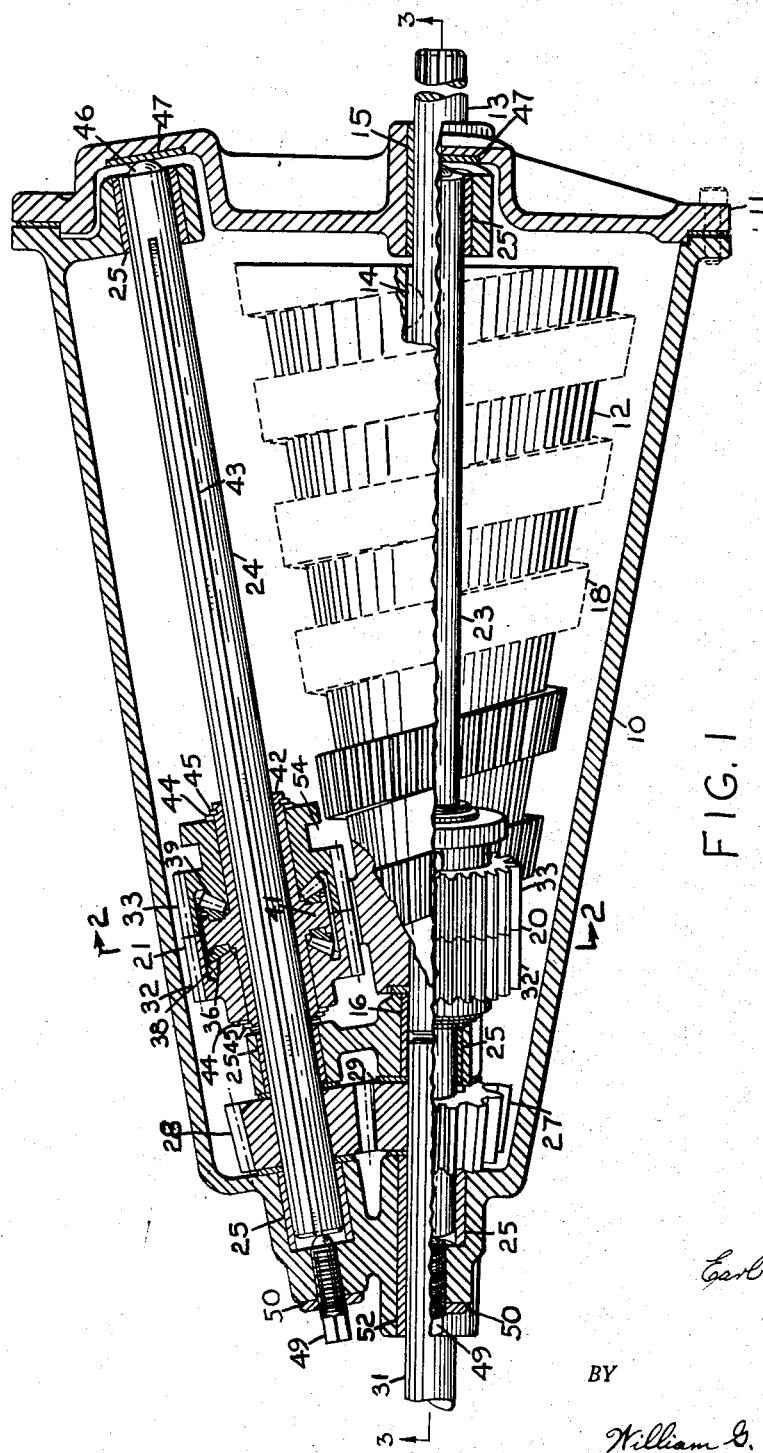
Figure 1 is a plan view, partially in section, of the basic elements of the invention.

With reference to Figure 1, basic elements of the invention are shown in operating position. A housing 10 and an end plate 11 for said housing 10 are adapted to support the elements of the invention. A conical gear member 12 is preferably connected to a shaft 13 by means of a key member 14. Said shaft member 13 is rotatably mounted in suitable bearing members 15 and 16 mounted in the end plate 11 and housing 10, respectively. The conical member 12 has generated upon its conical surface a spiral path of teeth 18, said spiral path having a constant lead along a line parallel with the conical surface, i. e., a constant rate of advance per revolution. Each gear tooth in said spiral path of teeth 18 is preferably of the crown face type. The teeth in said spiral path of teeth 18 are equally spaced, but with the constantly changing diameter along the spiral path, it is understood that the number of teeth per inch of circumference at the various diameters along the cone will vary uniformly.

Two differential members 20 and 21 are positioned in operable engagement with and adjustably parallel with the conical surface of said conical gear member 12. Said differential members 20 and 21 are differentially keyed to differential shafts 23 and 24 which are, in turn, rotatably mounted in suitable bearing members 25. Said differential shafts 23 and 24 are angularly positioned approximately 90° about the center line of the conical gear member 12, with respect to each other, and are drivably keyed to bevel gears 27 and 28, respectively. Said bevel gears 27 and 28 are, in turn, operably connected to a central bevel pinion 29, which is drivably keyed to a primary shaft 31.

The differential members 20 and 21 are constructed with adjacent gear members 32 and 33 differentially connected by means of differential pinions 36 in engagement with bevel gears 38 and 39 generated on facing surfaces of the respective adjacent gear members 32 and 33. Said differential pinions 36 are rotatably mounted on drive pins 41 that are rigidly affixed to a drive sleeve 42. Said drive sleeve 42 is, in turn, slidably keyed to said differential shafts 23 and 24 by a standard key member (not shown) slidably mounted in keyway 43. The adjacent gear members 32 and 33 are rotatably mounted on said drive sleeve 42 and are axially retained thereon by means of a thrust washer 44 held in place by a locking ring 45. The axial position of the differential shafts 23 and 24 is maintained by means of a hardened ball point 46 at the end of each of said shafts, said ball point 46 being in substantially a point contact for bearing with a hardened washer 47 mounted in the removable end plate 11 of the housing member 10. Pressure of the ball point 46 against the hardened washer 47 is maintained by means of an adjusting screw 49 provided with a hardened ball point bearing against the opposite end of said shafts 23 and 24. A locking nut 50 is adapted to lock the adjusting screw 49 in place once the proper setting is obtained.

The primary shaft 31 is rotatably mounted in a primary shaft bearing 52, said primary shaft 31 being adapted to receive connecting means (not shown) for purposes of assembly to driving or driven mechanisms. It should be noted that for purposes of clarity, the adjustment means was omitted from Figure 1, but is shown in Figures 2 and 3.

Figure 2:
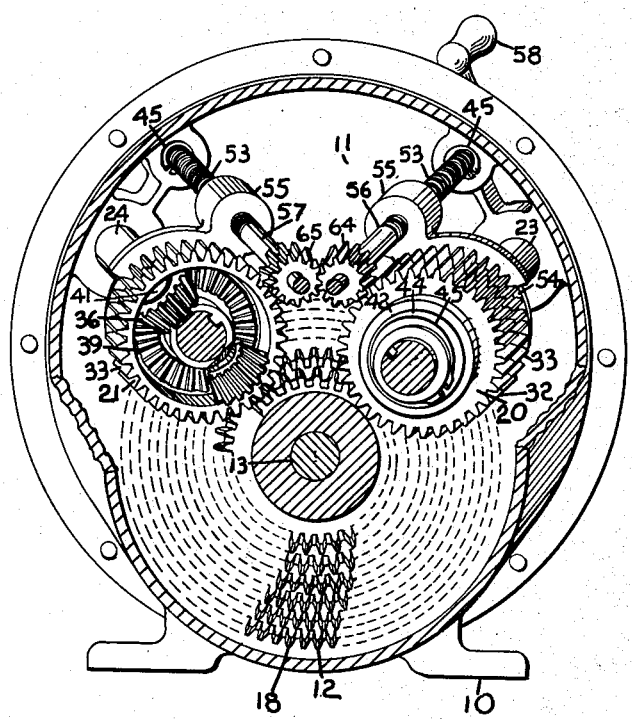
Figure 2 is a cross-sectional end view taken substantially along line 2—2 of Figure 1.
Figure 3:
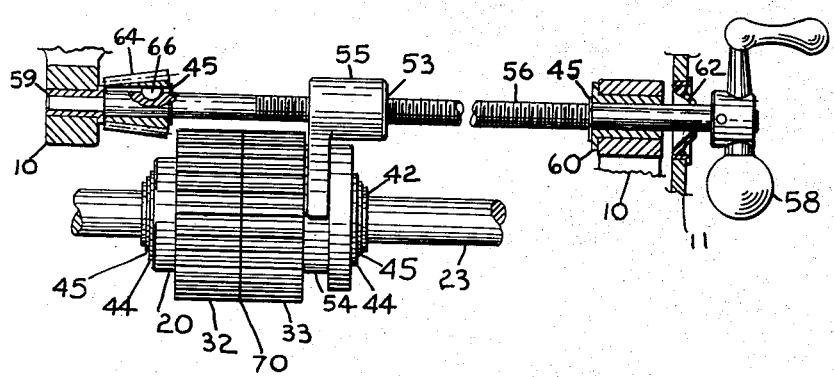
Figure 3 is a side view, partially in section, of a portion of the invention illustrating the differential member and its adjustment means.

With reference to Figure 2, a sectional view of the preferred embodiment of the invention is shown, taken along line 2—2 of Figure 1. An embodiment of an adjustment means 53, not shown in Figure 1, is illustrated. Reference should also be made to Figure 3, which illustrates a portion of this embodiment taken substantially along line 3—3 of Figure 1 to illustrate the adjustment means 53 for the differential members 20 and 21. A recess 54 is formed in the differential gear member 33 to receive an adjustable yoke member 55, said yoke 55 being in slidable contact with said differential gear member 33, yet axially retained in said recess 54. Threaded engagement between the yoke member 55 and an adjustment screw 56, as well as a secondary adjustment screw 57, effects the axial location of the differential members 20 and 21 when said adjustment screws are rotated. Rotation of said adjustment screw 56 can be effected by means of a prime mover or manually as illustrated by means of the manual adjustment handle 58. The adjustment screw 56 is mounted in suitable bearing members 59 and 60. The seal member 62, mounted in the end plate 11 of the housing 10, protects the mechanism from exposure to abrasive dirt, etc. Adjustment screw pinions 64 and 65 are keyed to said adjustment screws by a key element 66, thereby providing positive engagement between the adjustment screw 56 and the secondary adjustment screw 57, which is similar in construction to the adjustment screw 56 except that the driving means is omitted. The axial position of the adjustment screws 56 and 57, as well as the pinions 64 and 65 thereon, is maintained by locking rings 45.

Figure 4:
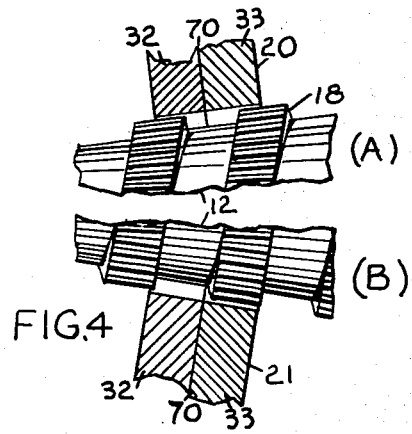
Figure 4 is a schematic diagram illustrating the relative position of tooth engagement at a point in one revolution of the conical member.
Figure 6:
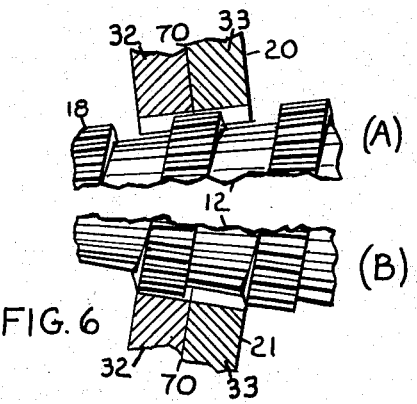
Figure 6 is a schematic diagram illustrating the relative position of tooth engagement at still another point in one revolution of the conical member.
Figure 5:
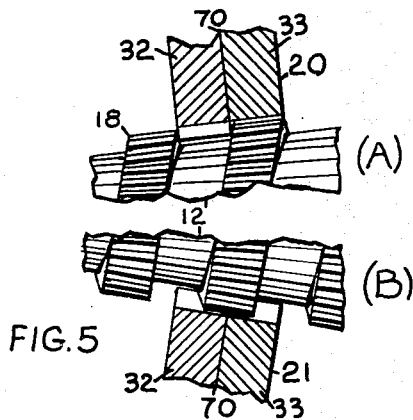
Figure 5 is another schematic diagram illustrating the relative tooth engagement positions at another point in one revolution of the conical member.
Figure 7:
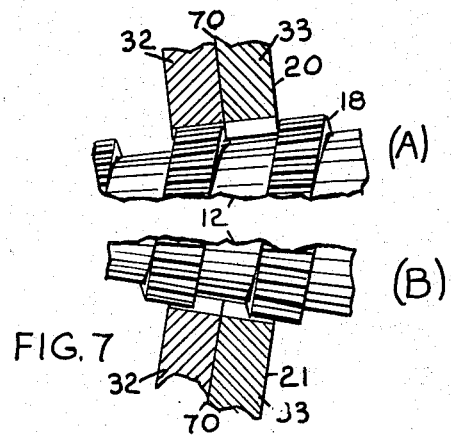
Figure 7 is still another schematic diagram illustrating the tooth engagement between the differential member and the conical member at still another point in one revolution of the conical member.

The conical gear member 12, during operation, engages the differential members 20 and 21 in an engagement pattern which is repeated every 360° of revolution of the conical member 12. There are four stages to this pattern, as shown schematically with reference to Figures 4, 5, 6 and 7. Figure 4, parts A and B, represents the two differential members in their respective engaging relationships with the conical member 12 at one point during a revolution of the conical member 12. Figure 5, parts A and B, represents the second stage when the conical member 12 has rotated 90° from the position shown in Figure 4. Figure 6, parts A and B, is 180° of rotation, and Figure 7, parts A and B, is 270° of rotation from the position shown in Figure 4. In all four stages shown in Figures 4, 5, 6, and 7, at least one of the differential members is engaged with the toothed path on said conical member 12 in such a manner that the mean diameter of the conical gear engaging limits, which are determined by the width of the differential member and its adjusted position with respect to the conical gear surface, is the effective diameter determining the ratio of turning between the conical gear and a differential member.

There are two conditions in which the mean diameter between engaging diametral limits becomes the effective diameter. One of these conditions is shown at Figure 4A, in which the line 70 dividing the two differential gears is in a central position with respect to the space between the spiral tooth path 18. The other condition is shown in Figure 5B, in which one half of the spiral toothed path 18 is engaged with one of the differential gears and the other half of the spiral path is engaged with the other differential gear. When one differential member is in one of the above described conditions of contact with the mean effective diameter, the other differential member is in the position of selective meshing shown in Figure 4B, wherein meshing of the teeth is about to occur. In the four stages of a complete cycle, each of the differential members are progressively in alternating mean engagement and meshing position.

In operation, the differentially connected gear members, which are in meshing contact with the conical gear element having a spiral toothed path thereon, are responsive to the speed variations produced by the successively changing diameter of the spiral toothed path. With reference to one of the differential members, each gear is actuated while in contact with the spiral toothed path in such a manner that through each revolution of the conical member, engagement is effected, first to one differentially connected gear during 180° of conical gear element rotation and then to the other differential gear through the remaining 180° of conical gear element rotation.

Assuming the rotation of the conical gear to be cyclically uniform, the meshing differentially connected gears of each differential member vary in the ratio of turning relative to the conical gear member during a cycle.

One differential member being angularly displaced about the conical gear element surface relative to the other differential member, the progressive meshing contact and cyclic variation of one is out of phase with the other to the degree of angular displacement.

In a conical gear, with a constant lead spiral path and with uniformly spaced teeth along said spiral path, the rate of increase or decrease in number of teeth through 360° is the same throughout the lenght of the conical gear. Thus, the rate of increase through 90° is always the same. With the differential shaft of one differential member being held in fixed operable relationship by the other differential shaft through the bevel gearing, any angular displacement of one gear of the differential member in contact with the spiral path will cause an equal and opposite angular displacement and a positioning of the unmeshed differential gear of the other differential member. Therefore, if the tooth meshing is set for operation at, for example, the small end of the conical gear member, the differential members can be adjusted to the large end of the conical gear element with no change in meshing characteristics.

For purposes of illustration, a given uniform rotational movement applied to the primary shaft 31, as shown in Figure 1, would effect movement of the differential members, said members in turn actuating the conical gear element to produce uniform rotary motion to the shaft 13. Said rotary motion to shaft 13 is either reduced or increased, depending on the relative gear ratios between the differential members and the conical element. Input power could likewise be applied to the conical gear shaft 13 with the output motion being provided to the primary shaft 31. The preferred embodiment illustrated herein describes a speed changing device wherein two differential members may be angularly displaced from each other less than 180°. It should be noted that the invention is not limited to one pair of differential members, since there may be multiple differential members to increase the load carrying capacity, etc. In addition, multiple spiral toothed paths on the conical member may be used. As an illustration, a double spiral toothed path may be applied to the conical member, in which case, a single differential shaft may be employed with a double differential construction thereon.

Transmission units incorporating the elements of this invention have been found to be outstanding in their ability to provide a uniform variable speed without slippage, and thereby to fulfill a long-felt need for a device which would be both positive and variable in this operation.

Although a single embodiment of the invention has been illustrated and described, it is to be understood that the invention is not limited thereto. As various changes in the construction and arrangement may be made without departing from the spirit of the invention, as will be apparent to those skilled in the art, reference will be made to the appended claims for a definition of the limits of the invention.

What is claimed is:

1. In a variable speed device, the combination in a housing of a conical gear member on a shaft element, at least two differential members in engagement with said conical member and spaced less than 180° about the center line of said conical member and drivably mounted on differential shaft members, said differential members including at least two differentially connected gear members, and longitudinally adjustable means for said differential members.

2. In a variable speed device, the combination in a housing of a conical gear member on a shaft element having at least one spiral path of equally spaced teeth thereon, and at least two differential members in engagement with said conical member and drivably mounted on differential shaft members and spaced less than 180° about the center line of said conical member, said differential member including at least two differentially connected gear members.

3. In a variable speed device, the combination in a housing of a conical gear member drivably connected to a shaft member, at least two differential members drivably mounted on differential shaft members and drivably connected to a primary shaft member, said differential members including at least two differentially connected gear members, and longitudinally adjustable means for said differential members.

4. In a variable speed device, the combination in a housing of a conical gear member having at least one spiral path of equally spaced teeth thereon and drivably connected to a shaft member, a plurality of differential members drivably mounted on differential shaft members and spaced less than 180° about the center line of said conical member, said differential members including at least two differentially connected gear members, and in adjustable toothed engagement with said spiral path.

5. In a variable speed device, the combination in a housing of a conical member on a shaft element, at least two differential members drivably mounted on differential shaft elements and in operable relationship with said conical member, each differential member including at least two differentially connected members, and adjustment means whereby the position of said differential members may be selected.

6. In a variable speed device, the combination in a housing of a conical gear member on a shaft element, at least two differential members drivably mounted on differential shaft members and in operable relationship with said conical gear member, each differential member including at least two differentially connected gear members and adjustment means whereby the position of said differential members with respect to said conical gear member may be selected.

7. In a variable speed device, the combination in a housing of a conical member on a shaft element having at least one spiral engagement path thereon, and at least two differential members drivably mounted on differential shaft members and in engagement with said conical member, each differential member including at least two differentially connected members.

8. In a variable speed device, the combination in a housing of a conical gear member on a shaft element having at least one spiral engagement path thereon, at least two differential members drivably mounted on differential shaft members and in engagement with said conical gear member, each differential member including at least two differentially connected gear members, and adjustment means for said differential members whereby the axial adjustment of said members is effected along the conical engaging surface on said conical member.

9. In a variable speed device, the combination in a housing of a conical gear member on a shaft element having at least one spiral path of teeth thereon, at least two differential members drivably mounted on differential shaft members and in engagement with said conical member, each differential member including at least two differentially connected gear members, and longitudinally adjustable means for said differential members.

10. In a variable speed device, the combination in a housing of a conical gear member having a spiral engagement path thereon, and at least two differential members in adjustable toothed engagement with said spiral path, each differential member including at least two differentially connected gear members on a differential shaft member.

11. In a variable speed device, the combination in a housing of a conical gear member on a shaft element having at least one spiral toothed path of constant lead thereon, and at least two differential members drivably mounted on differential shaft members and in adjustable toothed engagement with said spiral path, each of said differential members including at least two differentially connected gear members.

12. In a variable speed device, the combination in a housing of a conical gear member on a shaft element having at least one spiral path of equally spaced teeth thereon, at least two differential members each drivably mounted on a differential shaft and each including two differentially connected gear members, said differential members being in longitudinally adjustable toothed engagement with said spiral path.

13. In a variable speed device, the combination in a housing of a conical gear member having at least one spiral engagement path thereon and drivably connected to a shaft member, at least two differential members each drivably mounted on a differential shaft, each in engagement with said conical member and each drivably connected to a primary shaft member, said differential members each including at least two differentially connected gear members, and adjustment means for said differential members whereby the axial adjustment of said members is effected along the conical engaging surface of said conical member.

References Cited in the file of this patent

FOREIGN PATENTS

| 16,792 | Great Britain | July 25, 1906 |
| 140,442 | Great Britain | Apr. 28, 1921 |
| 399,097 | Germany | July 28, 1924 |